United States Patent
Joy et al.

(10) Patent No.: US 9,414,259 B2
(45) Date of Patent: Aug. 9, 2016

(54) METHOD AND SYSTEM FOR MANAGING QUALITY OF SERVICE POLICIES

(71) Applicant: AT&T Intellectual Property I, LP, Atlanta, GA (US)

(72) Inventors: Jennifer Joy, Santa Cruz, CA (US); David Small, Dublin, CA (US); Thomas Spencer, IV, Morganville, NJ (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/711,292

(22) Filed: Dec. 11, 2012

(65) Prior Publication Data

US 2014/0160923 A1    Jun. 12, 2014

(51) Int. Cl.
*H04L 12/26* (2006.01)
*H04W 28/02* (2009.01)
*H04L 12/851* (2013.01)

(52) U.S. Cl.
CPC ....... *H04W 28/0268* (2013.01); *H04L 47/2408* (2013.01); *H04W 28/02* (2013.01)

(58) Field of Classification Search
CPC ..... H04L 47/10; H04L 43/50; H04L 12/2697; H04L 43/0852; H04L 43/00
See application file for complete search history.

(56) References Cited

U.S. PATENT DOCUMENTS

| | | | |
|---|---|---|---|
| 8,089,986 B2 | 1/2012 | Adamczyk et al. | |
| 8,184,637 B2 | 5/2012 | Cormier et al. | |
| 8,194,657 B2 | 6/2012 | Xiong et al. | |
| 8,259,566 B2 | 9/2012 | Chen et al. | |
| 8,761,095 B1* | 6/2014 | O'Brien | 370/329 |
| 2005/0091505 A1* | 4/2005 | Riley | H04L 12/5695 713/182 |
| 2006/0221829 A1* | 10/2006 | Holmstrom et al. | 370/230 |
| 2007/0047527 A1* | 3/2007 | Croak | H04L 12/5695 370/356 |
| 2008/0069018 A1* | 3/2008 | Gast | 370/310 |
| 2010/0049859 A1* | 2/2010 | Petersson | H04L 41/5003 709/229 |
| 2010/0054257 A1* | 3/2010 | Dolganow et al. | 370/395.21 |
| 2011/0202647 A1* | 8/2011 | Jin et al. | 709/223 |
| 2011/0211439 A1* | 9/2011 | Manpuria et al. | 370/216 |
| 2013/0290124 A1* | 10/2013 | Drake et al. | 705/26.3 |

* cited by examiner

*Primary Examiner* — Edan Orgad
*Assistant Examiner* — Rebecca Song
(74) *Attorney, Agent, or Firm* — Fay Kaplun & Marcin, LLP

(57) ABSTRACT

A method includes receiving an indication relating to an invocation of an application by a mobile device; determining, in response to the indication, a quality of service based on a provisioning parameter; and instructing a network element of a communications network to manage traffic relating to the application based on the quality of service and a loading condition in the communications network.

14 Claims, 3 Drawing Sheets

METHOD AND SYSTEM FOR MANAGING QUALITY OF SERVICE POLICIES

BACKGROUND

Quality of Service ("QoS") policies are typically implemented within a telecommunications network in order to provide for proper prioritization and routing of different types of traffic. Such policies may enable users or applications on telecommunications network to receive preferential treatment within the network. Standard implementations of QoS policies allow for the policies to be configured only on a static basis, meaning that application or forwarding class mixtures (i.e., QoS profiles) are set and do not change over time.

SUMMARY

The exemplary embodiments are directed to a method including receiving an indication relating to an invocation of an application by a mobile device; determining, in response to the indication, a quality of service based on a provisioning parameter; and instructing a network element of a communications network to manage traffic relating to the application based on the quality of service and a loading condition in the communications network.

The exemplary embodiments are further directed to policy server for a communications network including a memory storing a set of instructions. The policy server also includes a processor executing the set of instructions to perform operations including receiving an indication relating to an invocation of an application by a mobile device; determining, in response to the indication, a quality of service based on a provisioning parameter; and instructing a network element of the communications network to manage traffic relating to the application based on the quality of service and a loading condition within the communications network.

The exemplary embodiments are further directed to a tangible computer-readable storage medium storing a set of instructions executable by a processor. When executed by the processor, the instructions cause the processor to perform operations including receiving an indication relating to an invocation of an application by a mobile device; determining, in response to the indication, a quality of service based on a provisioning parameter; and instructing a network element of a communications network to manage traffic relating to the application based on the quality of service and a loading condition of the communications network.

DETAILED DESCRIPTION

Figure 1:
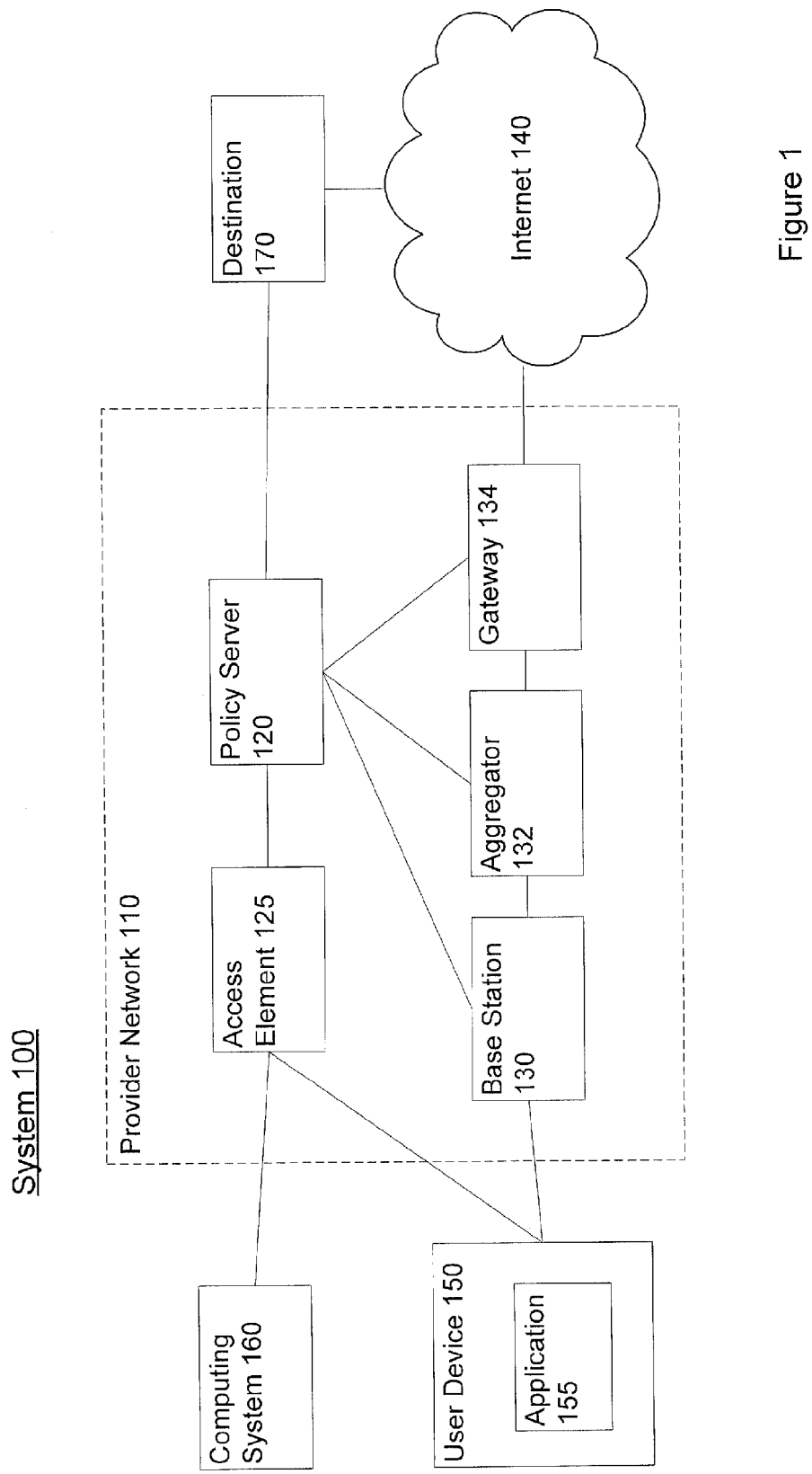
FIG. 1 shows a system for managing quality of service policies according to an exemplary embodiment.

The exemplary embodiments may be further understood with reference to the following description and the related appended drawings, wherein like elements are provided with the same reference numerals. Specifically, the exemplary embodiments relate to methods and systems for managing quality of service ("QoS") policies in a telecommunications network.

Telecommunications providers typically implement QoS policies for controlling the various types of traffic that they transport. Such policies are commonly used to ensure that computer networks are capable of providing an acceptable user experience for voice communications over data networks (e.g., Voice over Internet Protocol). QoS policies may prevent transmission problems such as low throughput, dropped packets, corrupted packets, latency, jitter, and out-of-order packet delivery. While QoS policies may be most commonly used to provide for suitable quality for voice communications, they may also be used for various other types of data transfer having specific service requirements (e.g., online gaming, video chat, online video viewing, etc.).

Various mechanisms may be used to implement QoS policies. Network service providers may generate the capacity for high-level QoS settings by over-provisioning a network so that the network's capacity is based on peak traffic loading levels. Over-provisioning may entail physical redundancy of network links, but may be wasteful during some use cases due to varying numbers of network users. Additionally, because the Internet is not a single network, but, rather, a network of different networks maintained by different providers, simple over-provisioning of one provider's network may be insufficient to provide different QoS settings. Thus, the Differentiated Services ("DiffServ") protocol may also typically be used for implementing QoS settings across different service provider networks. Using DiffServ, packets are marked according to the type of service they are to receive, and network switching equipment then uses various routing and queuing strategy to provide the required performance. This may involve giving packets having high QoS requirements priority over other packets in queues. In another embodiment, the Integrated Services ("IntServ") protocol may be used; under this protocol, applications may use the Resource Reservation ("RSVP") protocol to request and reserve resources within a network.

Typically, QoS policies for telecommunications services may be set as part of a user's service plan. Users may have the option to pay premium rates for higher QoS settings, or may agree to accept lower QoS settings in exchange for discounted rates. However, existing network hardware and settings may have any type of control mechanism to respond to changing behavior at customer endpoints. QoS settings may typically be predetermined as part of a user's subscription plan, as described above. However, a user endpoint may have changing types of requirements for differing types of applications, such as requiring high reliability for online gaming, or low jitter for video streaming. It will be apparent that these requirements may change over time. Because of these changing requirements, the standard static QoS policies do not work well. Rather, users may wish to be able to request differing behavior (i.e., differing QoS settings) for a short period of time, rather than having preprovisioned QoS. Additionally, users may wish to have their telecommunications provider be able to detect the launch of an application requiring a different QoS, determine whether the user has access to different QoS for that application, and adjust performance accordingly.

FIG. 1 illustrates a system 100 according to an exemplary embodiment. The system 100 includes a service provider network 110 delineating the perimeter of the physical and virtual components maintained by a network service provider. The service provider network 110 includes a policy server 120, which may enable a service provider maintaining the service provider network 110 to provide for QoS management according to an exemplary method which will be described in further detail below. The policy server 120 of the service provider network 110 may be end-user-accessible by means of a access element 125, which may be, for example, a web portal, an application programming interface, a software application, or any other type of mechanism by which a user may access a remote server. The service provider network 110 may also include network routing equipment including a base station 130, such as a Universal Mobile Telecommunications System ("UMTS") Node B or a Global System for Mobile Communications ("GSM") base transceiver station ("BTS") for communicating directly with mobile user equipment. The network routing equipment of service provider network 110 may also include an aggregator 132 and a gateway 134; the gateway 134 may provide an interface between the service provider network 110 and the Internet 140. Though the service provider network 110 is described as including specific elements, those of skill in the art will understand that the listed elements are only exemplary, and that other service provider networks 110 may include different combination of equipment.

The service provider network 110 may be accessed by a user device 150. The user device 150 may be any type of device with which a user may access a telecommunications network (e.g., a mobile device, a desktop computer, a set-top box, etc.). A user of the user device 150 may wish to receive modified QoS for a session of an application 155, and may access such service according to methods that will be described in further detail below. In some cases, the modified QoS may be improved QoS in order to provide an improved user experience for applications such as Voice over Internet Protocol or streaming video; in other cases, the modified QoS may be decreased QoS, which the user of user device 150 may agree to receive in exchange for a discount on service fees. The request may involve the use of computing system 160, such as a notebook or desktop computer, to access the access element 125 and directly request modified QoS. In some embodiments, the user device 150 and the computing system 160 may be the same device (e.g., a smartphone), and the user may access access element 125 directly from user device 150.

The modified QoS may be requested in order to provide a change in the quality of access to a destination 170 via the Internet 140. Those of skill in the art will understand that the use of the term "destination" is not intended to be limiting as to the type of communication between the user device 150 and the destination 170. The destination may be any other network destination to which the user of the user device 150 may wish to connect for any purpose (e.g., voice communication, video chat, gaming, viewing of streaming video, etc.); thus, for some types of application 155, such as viewing streaming video, the destination 170 may, in fact, be the source of the data to be transmitted with improved quality of service.

It will be apparent to those of skill in the art that the illustration of a single base station 130, aggregator 132, and gateway 134 is only an example intended to illustrate one path of network traffic from user device 150 to destination 170, and that other provider networks may include varying types or numbers of network routing components. It will be further apparent to those of skill in the art that, in other exemplary embodiments, a provider network may include components providing functions other than those directly related to traffic routing, and that those other types of components may also be instructed to behave in a manner so as to provide for modified QoS settings in accordance with the exemplary methods which will be described hereinafter. Such components may include a network management platform, a data gathering platform, an alarming system, a network telemetry gathering system, etc. Additionally, while FIG. 1 illustrates a destination 170 that is external to provider network 110, in another exemplary embodiment, the destination being accessed by user device 150 may be disposed within the provider network 110; in a further exemplary embodiment, there may be destinations both within and external to provider network 110.

Figure 2:
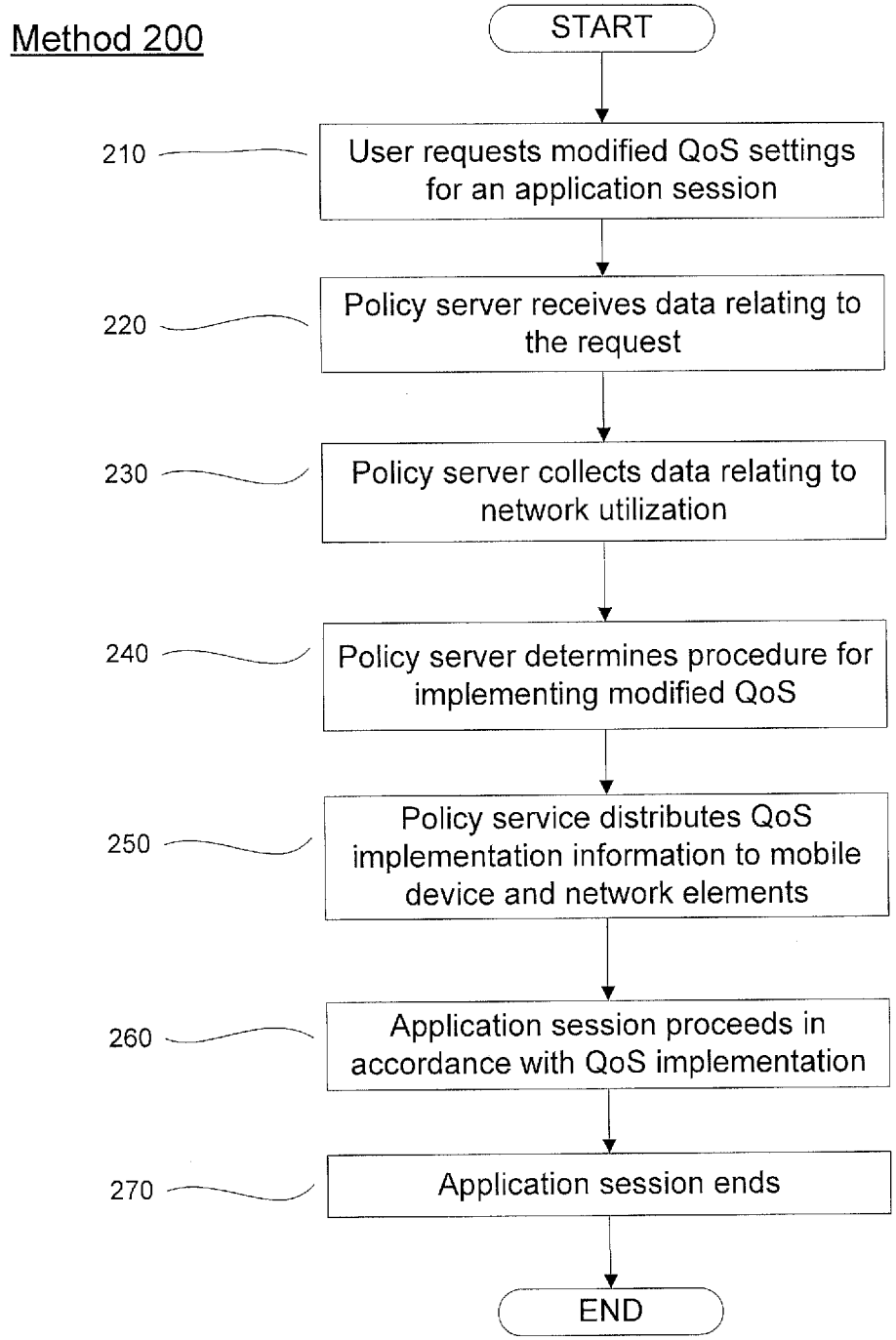
FIG. 2 shows a method for managing quality of service policies using a system such as the system of FIG. 1 according to a first exemplary embodiment.

FIG. 2 illustrates a method 200 according to a first exemplary embodiment. The method 200 will be described with specific reference to the elements of the system 100 illustrated in FIG. 1, but those of skill in the art will understand that the broader principles behind the method 200 may also be applicable by differing combinations of system elements than those illustrated. Additionally, those of skill in the art will understand that, within a network maintained by a telecommunications provider, the method 200 may be simultaneously invoked by multiple user devices such as the user device 150, and may therefore be performed in multiple simultaneous instances.

In step 210, the user of the user device 150 requests modified QoS settings for a communications session using a given application 155 on the user device 150. In one exemplary embodiment, the request may include a period of time for which the modified QoS settings are to be in effect. As described above, this may be accomplished by contacting the access element 125, either using user device 150 itself or a separate computing system 160, in order to inform policy server 120 of the request for modified QoS settings. Additionally, depending on the options the provider of service provider network 110 may choose to offer to its users, the user's request may contain different levels of detail. For example, the request may be abstract (e.g., the user may simply be able to request improved performance in a generalized manner without providing any detail), may be selected from a plurality of quality levels (e.g., the user may be able to select "Minor Boost" or "Major Boost"), or may be a request for a specific type of modified QoS (e.g., the user may be able to select "Improved Download Rate," "Improved Upload Rate," "Improved Reliability," etc.).

In step 220, the policy server 120 receives data relating to the request, either from user device 150 or computing system 160, via the access element 125. In step 230, the policy server 120 collects data relating to loading conditions within the provider network 110 (e.g., traffic and usage data) from the base station 130, gateway 132, and aggregator 134, and other elements of the provider 110 not specifically mentioned herein. Data received may include the amount of traffic currently being handled by each element of the provider network 110 (e.g., each base station 130, each gateway 132, and each aggregator 134 present within the provider network 110), the type or types of traffic currently being handled by each element of the provider network 110, the priority of the various traffic currently being handled by each element of the provider network 110, and similar data relating to traffic being received by the provider network 110 from the Internet 140 and vice versa.

In step 240, the policy server 120 determines, based on the data received in step 230, an appropriate action or actions to undertake in order to implement the modified QoS requested in step 210. In one exemplary embodiment, this may include the use of DiffServ packet markings, as described above, in order to indicate the packets that should be receiving preferential QoS treatment. In another exemplary embodiment, this may involve the use of IntServ reservations to allow the application 155 launched in step 220 to reserve resources within the provider network 110. This determination may be based solely on the request for modified QoS, or may be further based on conditions within the provider network 110 overall. For example, if the data retrieved from the components of the provider network 110 indicate that an emergency situation is extant (e.g., a natural disaster), and that the provider network 110 is being used by emergency personnel (e.g., police, fire departments, emergency medical personnel), fewer or less potent actions may be taken to implement the requested QoS than if no such situation is extant.

The determination of step 240 may also be based on the requests received within substantially the same time interval from other user devices communicating with the provider network 110. For example, stronger preferential QoS treatment may be provided to the user device 150 if there are few other user devices that are simultaneously requesting improved QoS treatment, than if there are a comparatively larger number of user devices making such requests. The determination of step 240 may also be based on the timing of the request of step 210. For example, if the user device 150 has requested preferential QoS treatment during off-peak hours, the measures taken to provide such treatment may be greater than those taken if the request was made during peak hours. The different factors considered in making the determination of step 240 may be weighted based on importance or other criteria (e.g., an emergency condition requiring bandwidth or other network resources to be available for emergency personnel may outweigh a user request for improved QoS).

The determination of step 240 may also be based on the application 155 launched by the user in step 220. This may be based on the type of the application 155 (i.e., different types of preferential QoS treatment may be appropriate for a video chat session than for an online game), or the specific identity of the application 155 (e.g., a global positioning service application that is provided to users for a premium fee may also entitle the user to better preferential QoS treatment).

In step 250, the policy server 120 propagates the specific policy decisions relating to the modified QoS treatment to various destinations. This may involve instructing the user device 150 to mark packets appropriately for the modified QoS (e.g., using DiffServ markings), instructing the components of the provider network 110 (e.g., base station 130, aggregator 132 and gateway 134) to treat the packets generated by the user device 150 according to the modified QoS treatment, etc. The policy server 120 may also be linked with the destination 170, whether the destination 170 is within or external to the provider network 110, and may instruct the policy server to treat packets associated with communication with the user device 150 in accordance with the modified QoS treatment.

In step 260, the operation of the application 155 being run by user device 150 proceeds in accordance with the policy decisions made in step 240 and propagated in step 250. As noted above, this may involve the user device 150 marking packets relating to the application 155 in an appropriate manner, as well as the base station 130, aggregator 132, and gateway 134 routing traffic relating to the application 155 accordingly. In step 270, the session of application 155 on the user device 150 terminates. In some exemplary embodiments, in response to the termination of the session in step 270, the policy server 120 may revert the policy changes that were made in steps 240-250, and the user device 150, base station 130, aggregator 132 and gateway 134 return to operating as they did before the initiation of the method 200. In another exemplary embodiment, the request of step 210 may specify a time limit for the modified QoS settings to be in effect, and the settings may revert after the conclusion of the time limit. After step 270, the method 200 terminates.

Figure 3:
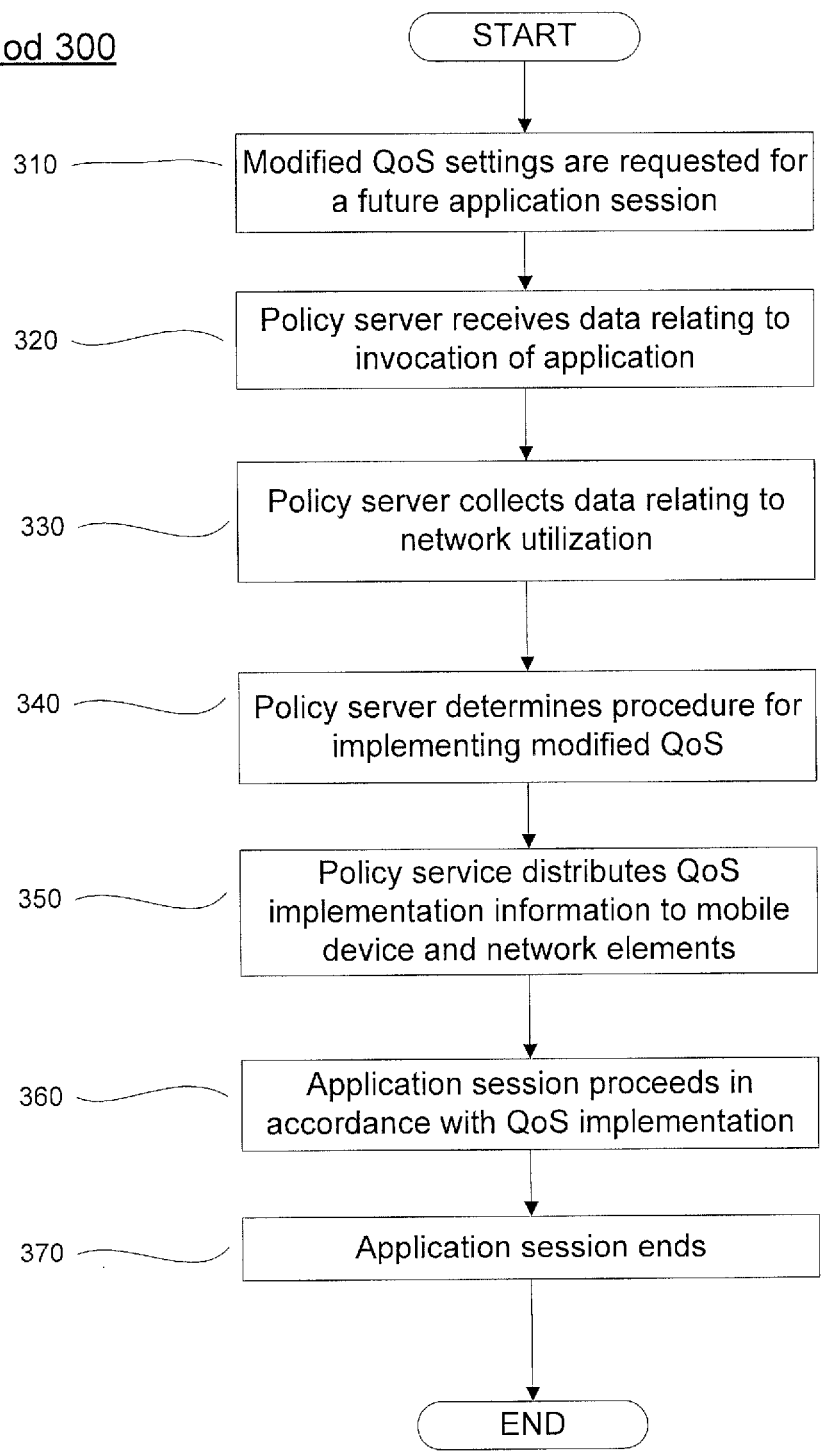
FIG. 3 shows a method for managing quality of service policies using a system such as the system of FIG. 1 according to a second exemplary embodiment.

FIG. 3 illustrates a method 300 for managing quality of service policies using a system such as the system of FIG. 1 according to a second exemplary embodiment. The method 300 differs from the method 200 in that in method 300, the user of user device 150 preconfigures the request for modified QoS treatment for a given application or class of application, such as at the time of signing up for service or as an option in an online account management interface, whereas, in the method 200, the user of the user device 150 requests modified QoS treatment substantially concurrently with beginning an application session for which the preferential QoS treatment is being requested.

In step 310, a request for modified QoS treatment is generated for an application 155 to be run on user device 150. As noted above, the request may be made by the user of the user device 150 at the time of signing up for service or as an option in an online account management interface. In some embodiments, the request may be for a class of applications (e.g., all applications involving video streaming) rather than simply for a single application. The request may be made using an interface on the user device 150 itself or through a different device, such as by accessing access element 125 using computing system 160. The request may be received by policy server 120, associated with the user and the user device 150, and stored for subsequent retrieval (e.g., in a database) as will be described in further detail below.

In another embodiment, the request of step 310 may be made by the destination 170. In one such exemplary embodiment, the destination 170 may be a large-scale content provider (e.g., a creator and/or distributor of entertainment content), and may arrange with the provider of provider network 110 for content from destination 170 to receive preferential QoS treatment to users of devices such as user device 150, or to a subset of users (e.g., users matching a given demographic profile), in order to provide for a positive user experience. This may be desirable by such a destination 170 in order to encourage the user of user device 150 to subscribe to premium services offered by the destination 170, make related purchases of physical media, etc.

In step 320, the policy server receives data relating to the invocation of application 155 on user device 150. This step may be substantially similar to step 220 of method 200, except that, as noted above, it need not be substantially concurrent with the generation of the request in step 310, but, rather, may typically be subsequent to the generation of the request. In step 330, the policy server 120 receives data relating to traffic and usage within the provider network 110 from the base station 130, gateway 132, and aggregator 134, in the manner described above with reference to step 230. In addition, based on the indication of the invocation of the application 155, the policy server 120 accesses and retrieves the data relating to the request for modified QoS treatment of step 310.

In step 340, the policy server 120 determines, based on the data received in step 330, an appropriate action or actions to undertake in order to implement the modified QoS requested in step 310. This step may proceed in a substantially similar manner to step 240 of method 200. In step 350, the policy server 120 propagates the specific policy decisions relating to the modified QoS treatment to various recipients (i.e., the elements of the provider network 110 and the destination 170) in the manner described above with reference to step 250 of method 200.

In step 360, the operation of the application being run by user device 150 proceeds in accordance with the policy decisions made in step 340 and propagated in step 350. As noted above, this may involve the user device 150 marking packets relating to the application in an appropriate manner, as well as the base station 130, aggregator 132, and gateway 134 routing traffic relating to the application accordingly. In step 370, the application session on the user device 150 terminates. As noted above, in some exemplary embodiments, after the termination of the session in step 370, the policy server 120 may revert the policy changes that were made in steps 340-350, and the user device 150, base station 130, aggregator 132 and gateway 134 may return to operating as they did before the initiation of the method 300. After step 370, the method 300 terminates.

As noted above, in contrast to the request for modified QoS for a single session of application 155 governed by method 200, method 300 involves preprovisioning so that the user of user device 150 does not have to manually request modified QoS each time the application 155 is to be launched. Thus, it will be apparent to those of skill in the art that, by including step 310, the method 300 describes an initial preprovisioning of the user device 150 and application 155. In subsequent performances of the method 300, the user of user device 150 may begin its performance by executing the application 155 (i.e., step 320 of method 300), and the method 300 will proceed in substantially the same manner without the need to again perform the preprovisioning of step 310. However, because the overall loading conditions of provider network 110 may be different during each invocation of application 155, the specific implementation of modified QoS (i.e., the performance of steps 340-360) may be different during each such invocation, rather than simply treating each invocation of application 155 in an identical manner.

In another, broader, implementation, the policy server 120 may analyze patterns of requests for improved QoS made over the course of multiple performances of the methods 200 and 300. In such an embodiment, and may provide a recommendation to the provider of provider network 110 of a manner in which the provider might develop and provision the provider network 110 in order that it may be best equipped to handle subsequent requests for modified QoS settings. As will be apparent to those of skill in the art, such recommendations might include the addition of more base stations 130 to the provider network 110, redistribution of existing base stations 110, reinforcement of network links within the provider network 110, etc.

The exemplary embodiments have been described specifically with reference to a single policy server 120 that collects all relevant data (requests for modified QoS, network usage data, indications of emergency conditions, etc.), performs analysis of the relevant data, and propagates QoS-related policies throughout the provider network 110. However, it will be apparent to those of skill in the art that a large-scale provider network may include multiple policy servers (e.g., one for each of a plurality of regions of the provider network). Additionally, the tasks described above as being performed by the policy server 120 may be divided among more than one element (e.g., a policy server collecting data and propagating policies, and an analysis server analyzing the data to determine how to implement the policies).

The exemplary embodiments described above may provide advantages to the provider maintaining the provider network 110. The provider maintaining the provider network may be able to offer users a greater variety of options for modified QoS, on both preprovisioned and on-demand basis. QoS changes may be accomplished at the time that the changes are needed, rather than needing to be configured statically, and may be determined based on various conditions within a network and QoS requests by other devices, rather than simply based on the QoS requirements of the requesting device. By providing a wider variety of QoS options to users, new sources of revenue for the provider may become available. The provider may also be able to enter into agreements with providers of content to users, who may wish to have their content delivered at improved QoS levels, and realize new streams of revenue on this basis as well.

The exemplary embodiments described may also provide advantages the user of the user device 150. The user may be able to have added flexibility to request modified QoS settings, such as being able to request improved QoS only for a certain class of programs, only for a certain program, or only for a certain session of a certain program. This may enable the user to have a better user experience and more close control over the increased expenditure incurred by requesting modified QoS.

Those of skill in the art will understand that the above-described exemplary embodiments may be implemented in any number of manners, including as a software module, as a combination of hardware and software, etc. For example, the exemplary methods 200 and 300 may be embodied in a program stored in a non-transitory storage medium and containing lines of code that, when compiled, may be executed by a processor; the memory and processor may be elements of the policy server 120.

It will be apparent to those skilled in the art that various modifications may be made to the exemplary embodiments, without departing from the spirit or the scope of the invention described in the claims. Thus, it is intended that the invention described in the claims covers modifications and variations provided they come within the scope of the appended claims and their equivalents.

What is claimed is:

1. A method, comprising:
receiving a request for a specific type of modified quality of service setting from a user of a mobile device, wherein the specific type of modified quality of service setting comprises only one of an improved download rate or an improved upload rate, and wherein the request for the specific type of modified quality of service setting includes a specified period of time for which the modified quality of service setting is to be in effect;
receiving an indication relating to an invocation of an application by the mobile device;
determining, in response to the indication, a quality of service based on an application-specific provisioning parameter defined an entity providing content for the application, wherein the application-specific provisioning parameter is received prior to the indication and based on the request for the specific type of modified quality of service setting; and
instructing a network element of a communications network to manage traffic relating to the application based on the quality of service and a loading condition in the communications network.

2. The method of claim 1, wherein the application-specific provisioning parameter is received from one of the mobile device and a further user computing system.

3. The method of claim 1, wherein the application-specific provisioning parameter is received through one of a web portal, an application programming interface, and a software application.

4. The method of claim 1, wherein the application-specific provisioning parameter is received from the user during a customer signup process.

5. The method of claim 1, further comprising:
instructing the mobile device to mark data packets relating to the application based on the quality of service.

6. The method of claim 5, wherein the marking the data packets is performed in accordance with a Differentiated Services protocol.

7. The method of claim 1, further comprising determining whether to reserve resources within the communications network, prior to instructing the network element.

8. A policy server for a communications network, comprising:
a memory storing a set of instructions; and
a processor executing the set of instructions to perform operations comprising:
receiving a request for a specific type of modified quality of service setting from a user of a mobile device, wherein the specific type of modified quality of service setting comprises only one of an improved download rate or an improved upload rate, and wherein the request for the specific type of modified quality of service setting includes a specified period of time for which the modified quality of service setting is to be in effect;
receiving an indication relating to an invocation of an application by the mobile device;
determining, in response to the indication, a quality of service based on an application-specific provisioning parameter defined by an entity providing content for the application, wherein the application-specific provisioning parameter is received prior to the indication and based on the request for the specific type of modified quality of service setting; and
instructing a network element of the communications network to manage traffic relating to the application based on the quality of service and a loading condition within the communications network.

9. The policy server of claim 8, wherein the application-specific provisioning parameter is received from one of the mobile device and a further user computing system.

10. The policy server of claim 8, wherein the application-specific provisioning parameter is received through one of a web portal, an application programming interface, and a software application.

11. The policy server of claim 8, wherein the application-specific provisioning parameter is received from the user during a customer signup process.

12. The policy server of claim 8, wherein the method further comprises:
instructing the mobile device to mark data packets relating to the application based on the quality of service.

13. The policy server of claim 12, wherein the marking the data packets is performed in accordance with a Differentiated Services protocol.

14. A non-transitory computer-readable storage medium storing a set of instructions executable by a processor, the instructions, when executed by the processor, causing the processor to perform operations comprising:
receiving a request for a specific type of modified quality of service setting from a user of a mobile device, wherein the specific type of modified quality of service setting comprises only one of an improved download rate or an improved upload rate, and wherein the request for the specific type of modified quality of service setting includes a specified period of time for which the modified quality of service setting is to be in effect;
receiving an indication relating to an invocation of an application by the mobile device, the indication requesting a specific type of modified quality of service setting;
determining, in response to the indication, a quality of service based on an application-specific provisioning parameter defined by an entity providing content for the application, wherein the application-specific provisioning parameter is received prior to the indication the request for the specific type of modified quality of service setting; and
instructing a network element of a communications network to manage traffic relating to the application based on the quality of service and a loading condition of the communications network.

* * * * *